(12) United States Patent
Yabutani et al.

(10) Patent No.: US 7,076,339 B2
(45) Date of Patent: *Jul. 11, 2006

(54) ENERGY-SAVING SERVICE OFFERING METHOD AND APPARATUS THEREFOR

(75) Inventors: Takashi Yabutani, Hitachinaka (JP); Takaaki Miyabe, Mito (JP); Atsushi Abe, Hitachi (JP); Yuji Yamamoto, Hitachi (JP); Tetsuo Fujigaki, Hitachi (JP); Taichirou Yabuno, Hitachi (JP); Kazuo Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/913,396

(22) Filed: Aug. 9, 2004

(65) Prior Publication Data

US 2005/0010334 A1    Jan. 13, 2005

Related U.S. Application Data

(63) Continuation of application No. 09/661,373, filed on Sep. 13, 2000, now Pat. No. 6,775,595.

(30) Foreign Application Priority Data

Sep. 13, 1999    (JP) .................................. 11-258471

(51) Int. Cl.
*G01R 11/00* (2006.01)
*G01R 11/56* (2006.01)
(52) U.S. Cl. .................... 700/291; 705/412; 705/14
(58) Field of Classification Search ........... 700/291, 700/286, 11, 295, 282, 275, 276, 201; 705/412, 705/14, 34, 400, 7; 702/61, 62
See application file for complete search history.

(56) References Cited

U.S. PATENT DOCUMENTS

| | | | | |
|---|---|---|---|---|
| 5,717,609 A | * | 2/1998 | Packa et al. | 702/130 |
| 5,758,331 A | * | 5/1998 | Johnson | 705/412 |
| 6,424,871 B1 | * | 7/2002 | Nakajima et al. | 700/11 |
| 6,535,859 B1 | | 3/2003 | Yablonowski et al. | |
| 6,775,595 B1 | * | 8/2004 | Yabutani et al. | 700/291 |

FOREIGN PATENT DOCUMENTS

WO    WO 01/06612    7/2000

OTHER PUBLICATIONS

DOE/EE-0157 IPMVP International Performance Measurement and Verification Protocol Updated Version of 1996 North American Energy Measurement and Verification Protocol,Dec. 1997, pp. 1-194.*

International Performance Measurement & Verification Protocol, Section 4,0, Description of M & V Options, With Examples, pp. 90-182.

International Performance Measurement & Verification Protocol, Updated Version of 1996 North American Energy Measurement & Verification Protocol, Dec. 1997, pp. 1-89.

(Continued)

*Primary Examiner*—Leo Picard
*Assistant Examiner*—Stevend R. Garland
(74) *Attorney, Agent, or Firm*—Antonelli, Terry, Stout and Kraus, LLP.

(57) ABSTRACT

An energy saving support service offering method introducing energy saving equipment at least in a load facility with an expense of an energy saving support service provider and/or its cooperatives and performing an electric power saving operation by an energy saving equipment control operation.

14 Claims, 7 Drawing Sheets

OTHER PUBLICATIONS

Showcase Demonstration Case Study, "The Challenge: Optimizing Electric Motor Systems at a Corporate Campus Facility", A program of the U.S. Department of Energy, pp. 1-6, Sep. 1996.

International Performance Measurement & Verification Protocol, Appendix ll, Generic Application, pp. 183-194.

Energy Matters, Office of Industrial Technologies, Mar. 1999, pp. 1-13.

"Introduction of ESCO (an Energy Service Company) Service", by The Energy Conversation Center of Japan in Feb. 1997 Cover, Data Brochure No. 1.

"Report by Study Group for Introduction of ESCO Service", by The Energy Conversation Center of Japan in Mar. 1998 Cover, Data Brochure No. 2.

Communication from the Japanese Patent Office, Sending No. 088852, Sep. 25, 2001.

* cited by examiner

EXAMPLE OF ELECTRIC POWER CONSUMPTION CHARACTERISTIC OF BLOWER

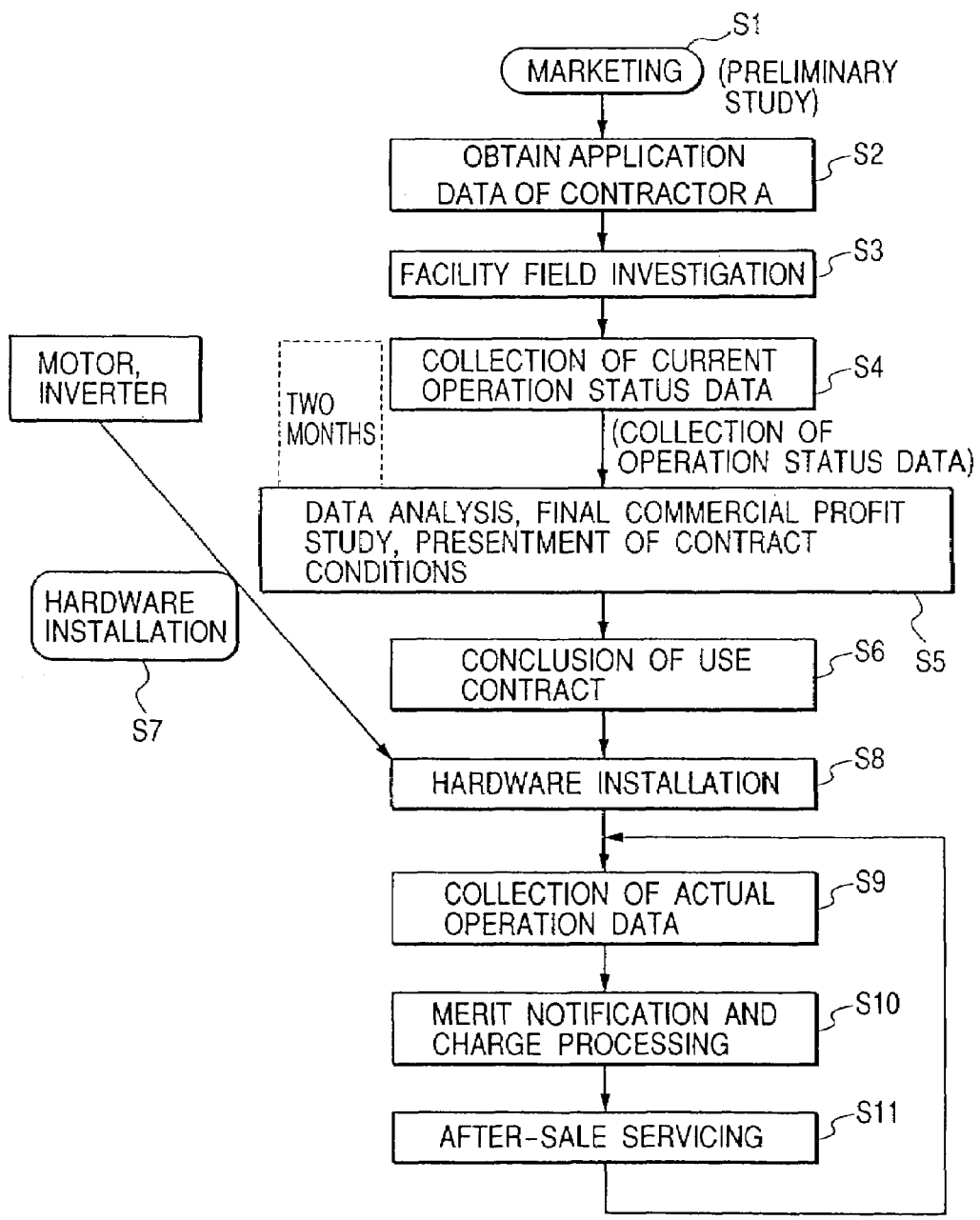

ENERGY-SAVING SERVICE OFFERING METHOD AND APPARATUS THEREFOR

CROSS REFERENCE TO RELATED APPLICATION

This is a continuation of U.S. application Ser. No. 09/661,373, filed Sep. 13, 2000, now U.S. Pat. No. 6,775,595, the subject matter of which is incorporated by reference herein.

BACKGROUND OF THE INVENTION

The present invention relates to an energy saving service offering method and its apparatus, which is suitable for use in connection with an energy saving operation performed for example, in factories.

In the Kyoto Conference on Global Warming held in December, 1997, a warming curtailment goal was defined so that the reduction fraction may be 6% of that in 1987. Taking this into consideration, the "Law related to Rationalization of Energy Usage (Energy Saving Law)" was amended and enforced in April of 1999. Though large-scale factories had been obligated by the law to engage in the promotion of energy saving features initially, the scope of the Energy Conservation Act was augmented to include medium-scale factories as well.

The load facility conventionally used in factories includes fans, blowers and pumps, and various motors are used for driving such equipment. It is often a common approach to install inverters in order to reduce the electric power consumption (promote energy saving) in various motors for driving this equipment. In the case of attempting to reduce electric power consumption by installing inverters, whether inverters should be purchased, rent or leased is determined by calculating the advantages brought about by installing inverters.

In the conventional method, in case of purchasing inverters, the initial investment is typically quite large, and in case of obtaining inverters on the basis of a lease or rental contract, the rental fee may be high or the user may be obliged to continue to pay the rental fee, even if the expected effect of energy saving is not attained by the user.

The conventional business schemes and their problems are described more specifically below according to those examples discussed above.

(A) Purchase Scheme and its Problem

In a case where the user purchases inverters combined with new motors, or purchases inverters alone, the user has to provide the initial investment and bear a heavy burden of a large investment, and such investments are assumed to be made before it is possible to determine the extent of the electric power consumption saving that may actually be attained.

(B) Lease or Rental Schemes and Their Problems

In leasing inverters with new motors, or inverters alone, the user enters into a contract whereby he or she purchases the installed facility or equipment within a fixed period of time. Therefore, the user can not cancel the contract and has to bear a heavy burden even if he or she does not need the facility or equipment any more.

In the rental contract, in which the user uses the facility or equipment by paying rental charges, the rental charge is typically comparatively higher than the lease charge.

The lease and rental schemes described above have a problem in that the user has to execute the contract and pay a certain lease or rental charge in advance before the extent of the electric power consumption saving is identified.

SUMMARY OF THE INVENTION

The present invention is directed to the problems described above. The present invention provides an energy saving service offering method and its apparatus for allowing the user to obtain his or her desired energy saving service without forcing the user wishing the energy saving service to put up any initial investment, and for allowing the energy saving service provider to experience a satisfactory commercial profit as well.

In accordance with the present invention, if the user hopes for an energy saving, and the energy saving service provider improves the existing facility of the user or installs a new facility for the energy-saving, and then the energy saving is attained as a result, the advantages brought about by the energy saving are shared between the user and the energy saving service provider by estimating the benefits of the energy saving quantitatively. The measure of the extent of the energy saving is based on the electric power saving, that is, the saved electricity charge.

The present invention provides an energy saving service offering method, which determines the present electric power consumption of the supervised load facility of the user who owns the supervised load facility, in which there are motors, and who is attempting to save energy, provides inverter control operation data when installing an inverter in the supervised load facility for performing motor speed control, determines a merit refund corresponding to the saved electric power consumption by referring to the difference between the present electric power consumption data and the inverter control operation data, and performs a billing and charge operation based on a merit refund under the contract conditions established between the energy saving service provider and its contractor.

The apparatus of the present invention is characterized as an apparatus comprising a supervisory unit for supervising the operation status of a supervised load facility having an inverter and a motor, a means for sending the actual operation data based on a motor speed control operation performed by the inverter in the supervised load facility from the supervisory unit through a communication system, a calculation apparatus for calculating the saved electric power consumption dependent of the difference between the estimated value for the electric power consumption of the load facility without inverters and the actual operation data of the inverter, and a processor for performing a billing and charge operation based on a merit refund under the contract conditions established between the energy saving service provider and its contractor.

BRIEF DESCRIPTION OF THE DRAWINGS

FIG. 8 is a flowchart showing a method representing one embodiment of the present invention.

DETAILED DESCRIPTION OF THE PREFERRED EMBODIMENTS

Figure 1:
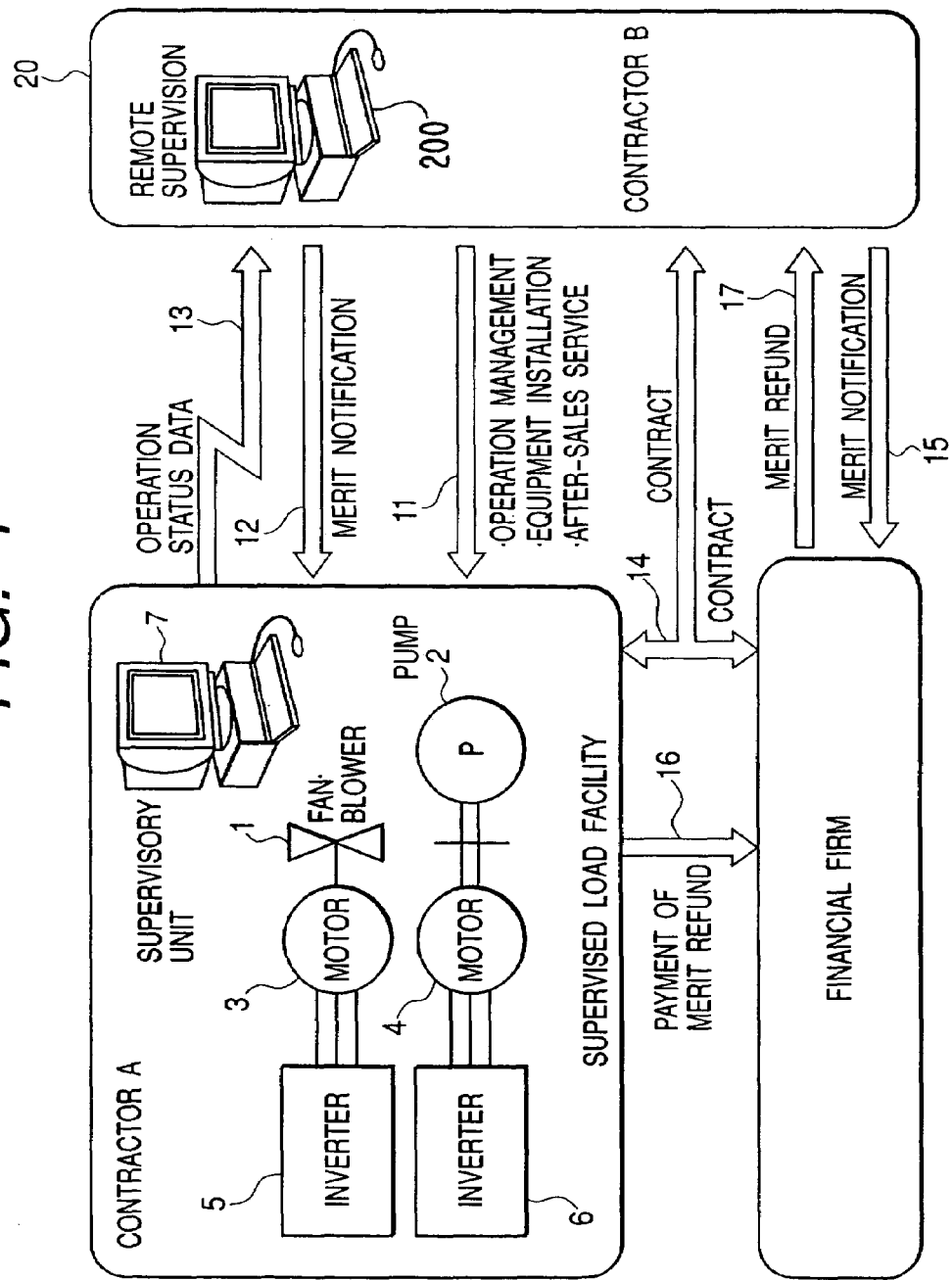
FIG. 1 is a schematic diagram of one embodiment of the present invention.

One embodiment of the present invention is directed to an energy saving service offering method which determines the present electric power consumption of the supervised load facility of the user, who owns a supervised load facility, in which there are motors, and who desires to save energy, provides inverter control operation data when installing an inverter in the supervised load facility for performing motor speed control, determines a merit refund corresponding to the saved electric power consumption by referring to the difference between the present electric power consumption data and the inverter control operation data, and performs a charge and billing operation based on a merit refund under the contract conditions established between the energy saving service provider and its contractor.

In the method according to another embodiment of the present invention, the present electric power consumption is obtained from the operation status of the supervised load facility having a motor, the inverter control operation data is provided when installing an inverter in the supervised load facility for performing motor speed control, a merit refund corresponding to the saved electric power consumption is calculated by referring to the difference between the present electric power consumption data and the inverter control operation data, and a billing and charge operation is performed based on a merit refund under the contract conditions established between the energy saving service provider and its contractor.

In another method according to the present invention, the present electric power consumption is obtained from the operation status of the supervised load facility having a motor, an inverter and a motor serving as replacements for the existing motor are introduced in the supervised load facility, the inverter control operation data is provided when performing the motor speed control operation, a merit refund is calculated based on the present electric power consumption and the saved electric power consumption of the supervised load facility including the inverter, and a contract including the allocation of the merit refund is established between the user of the supervised load facility and the provider of the inverter, the electric power consumption saving data is sent to the data collection system through the communication system, and the billing and charge operation to the user is performed on the basis of the merit refund defined by the contract.

The inverter control operation data is collected from the supervisory system through a communication means, such as LAN or telephone line. The present electric power consumption data represents the present actual operation status of the supervised load facility or its operation status under an assumed condition.

Therefore, in accordance with the present invention, it will be appreciated that the user can achieve the energy saving goal provided by the national government or contribute to the goal without any initial investment, and the service provider also can share in the benefits brought about by the energy saving operation. In accordance with this invention, because of the above-described features, since there is no need for guaranteeing a minimum energy saving refund to the user, unlike the lease or rental method, it will be appreciated that the service provider certainly accepts a merit fee in proportion to the electric power consumption saving.

The contractor B as one of the contract parties concerned (an energy saving service provider or an energy saving facility manufacturer) installs a combination of an inverter and a new motor, or an inverter by itself, into the facility of the contractor A (client or user), who desires to achieve an energy saving. In this case, if both the service provider and the user reach an agreement, pumps, fans and blowers, as well as inverters and motors, can be replaced or upgraded with new models.

The contractor A corresponds to one who wishes to receive the energy saving service, and the contractor B corresponds to a service provider who provides the energy saving service.

At first, the contractor B installs an operation status data collection system at the existing facility of the contractor A and defines a characteristic of the facility before electric power consumption saving by using the present operation status data for the existing facility. This characteristic is defined as the present electric power consumption. This characteristic is a contract condition that relates to a characteristic existing before electric power consumption saving is achieved. In case the user does not own the designated facility, the contract condition for the user is assumed to be defined as electric power consumption data of a facility of the same class owned by the service provider.

The operation status data collection system as described above collects the operation data of the existing facility and the upgraded facility and/or equipment employed after modifying or replacing any equipment, and works as one component of the remote supervisory system constructed in conjunction with the start of the service by using a communication means, such as telephone lines and so on through which the data to the supervisory system is transmitted at a necessary time interval as needed. Owing to this configuration and procedure, it will be appreciated that the electric power consumption of the equipment and the facility after improvement can be obtained and that a merit refund can be calculated.

The contractor A (user) determines whether he or she will accept the energy saving service offered by the energy saving service provider by considering the merit refund determined by the present electric power consumption and the electric power consumption saving after improvement of the facility and the equipment, and then, in case that he or she accepts the service, he or she executes the contract. In case the existing facility and equipment are not improved and/or replaced, and there is existing data for a facility of the same class, the service provider can estimate the present electric power consumption and the merit refund by precise calculation or approximate calculation and then present the results to the user as prerequisite conditions for the contract.

As for the contract conditions, it is possible to consider the benefit obtained by reduction of the electric power consumption, the cost for installing and replacing inverters and motors in the existing facility, and the fee, maintenance expense and charges for collecting the data to be paid to dealers from which inverters and motors are leased or rented by the service provider. If the user and the service provider agree with those conditions, they execute the contract for providing the electric power consumption saving system. Since the user does not pay any initial investment for the improvement and replacement of the facility and the equipment, and he or she accepts the system only after confirming or identifying approximately the extent of the prospective achievement of any energy saving, it will be appreciated that the user can at least achieve an energy saving, and furthermore that he or she also can get a share of the merit refund.

More specifically, the service provider and the contractor execute the electric power consumption saving motor drive system introduction contract, and the service provider calculates the refund charged for the electric power consumption saving and determines the usage charge of the electric power consumption saving motor drive system by referring to the predetermined rate, and requests the user to pay the usage charge. In this context, the term "usage charge" is determined not to be "the charge for using the introduced facility", but to be the merit refund corresponding to the sharing received by the contractor B as a definite fraction of the estimated electric power consumption saving of the contractor A.

When implementing this service, needless to say, the service provider can select whether the service provider operates the service by using his or her own assets or third-party, assets for motors, inverters and the data collection equipment (hereinafter referred to as service equipment).

According to the embodiment of the present invention, what is provided is an energy saving service offering apparatus comprising:

a supervisory unit for supervising the operation status installed in the supervised load facility having an inverter and a motor;

a means for transmitting the actual operation data based on the speed control operation of the motor by the inverter of the supervised load facility from the observation unit through the communication system;

an arithmetic unit for calculating the electric power consumption saving based on the difference between the estimated value of the electric power consumption of the load facility without an inverter and the actual inverter operation data; and a processor for calculating a merit refund based on the calculation result of the arithmetic unit, and performing the billing and charge operation based on the merit refund under the contract conditions established between the service provider and its contractors.

An apparatus in another embodiment of the present invention comprises:

an operation status data collection system having a supervisory unit for supervising the operation status installed in the supervised load facility having an inverter and a motor;

a means for collecting the actual operation data based on the speed control operation of the motor by the inverter of the supervised load facility from the observation unit;

an arithmetic unit for calculating the electric power consumption having based on the difference between the present operation data and the actual inverter operation data; and an output circuit for providing the calculated result of the arithmetic unit to LAN or a telephone line; and a processor for calculating a merit refund based on the calculation result of the arithmetic unit, and performing the billing and charge operation based on the merit refund under the contract conditions established between the service provider and its contractors.

One embodiment of the present invention will be described with reference to the attached drawings.

FIG. 1 is a schematic view of one embodiment of the present invention. What is shown in FIG. 1 is that the contractor A has a supervised load facility to be described later, and he or she executes a designated contract (contract including the sharing of the merit refund) with the contractor B, and the exchange of the merit refund is transacted through a financial firm. The contract entered into by the contractor A (user), the contractor B (service provider) and the financial firm is designated by the arrow 14.

The supervised load facility is a facility including a fan, a blower 1 or a pump 2 and so on, representative of equipment used in the factory, as described above, and even though they are not components in a major facility for production and manufacturing, but consume a large amount of electric power, the energy saving measures for them are relatively delayed so as to be behind schedule. Motors 3 and 4 of all types are used as driving sources for this facility. The users mostly desire to achieve an energy saving by making as little investment to the facility and equipment as possible.

The service provider measures the present electric power consumption of the facility of the user wishing to achieve the energy saving, or modifies its electric power consumption by considering various variable factors, and then, estimates the present electric power consumption of the facility. The estimated data and calculation results are presented to the user.

Next, the service provider installs an inverter and a new motor as a set at the individual facility of the user wishing to achieve the energy saving. If the user wants to renew the facility, the service provider installs a new motor, an inverter, a fan and a blower as a set. The speed control of the motors 3 and 4 by the inverters 5 and 6 is established by connecting the motors 3 and 4 to the inverters 5 and 6. The characteristic before the electric power consumption saving is defined by the present electric power consumption of the existing motor of the contractor A, which information is collected by the supervisory unit 7. This characteristic becomes a contract condition before the electric power consumption saving.

The electric power consumption of the new facility and equipment with the speed control of the motors 3 and 4 being provided by the inverters 5 and 6 is supervised by the supervisory unit 7 installed by the contractor B, and the inverter control operation data is obtained as the electric power consumption. The merit refund (electric power consumption saving) is obtained based on this operation data and the present electric power consumption.

Though the equipment, including the inverters 5 and 6, and the supervisory unit 7, are delivered by the contractor B, the fee for the delivery of this equipment is not charged and billed to the user. The sharing of the merit refund is negotiated between the user and the service provider according to the conditions described above. For this negotiation, the usage fee (with a lease or rental contract in most cases) for the inverters, motors, fans, blowers, and pumps to be installed in the user's facility by the service provider is considered. It is reasonable that this usage fee should be covered by the merit refund other than charged directly to the user.

The service provider provides operation administration and after-sales services for the inverters 5 and 6 in addition to the equipment delivery and installation services. This service flow is shown by the arrow 11.

The user enters into the electric power consumption saving motor driver system introduction contract with the service provider which covers the merit refund for the electric power consumption saving brought about by the speed control of inverters.

The inverter control operation data is supplied to the remote supervisory system 200 of the contractor B as operation status data. This data flow is shown by the arrow 13.

The contractor B calculates the electric power consumption due to the operation of the inverters by using the remote supervisory system 20, and estimates and determines the usage fee for the electric power consumption saving motor drive system based on a predefined rate, and performs charge and billing operations. The benefits obtained by the energy saving is shared between the contractor A and the contractor B based on a predetermined rate (payback rate). Since the energy saving contributed by the limited supervised equipment (fans, blowers and pumps) is subject to the operation status of the production line including that equipment, this energy saving is not covered in this contract. Thus, in this contract, only the merit corresponding to "the fraction of the energy saving over and above a definite saving level" is not shared, but the merit is shared with a payback rate independent of the total energy saving. In accordance with this invention, the allocation of the merit refund to the service provider likely may be larger than that for the contractor A, and thus, the merit refund to the contractor A vanishes in some cases.

The estimated amount of the merit refund is communicated to the contractor A by the contractor B. This notification is shown by the arrow 12. The charge and billing operations may be mediated by a financial institute such as financial firm of the type often used for money payment transactions. In this case, the contract for the intermediate service between the contractor A and the financial firm is established as shown by the arrow 14. The notification of the merit refund is also provided from the contractor B to the financial firm. This notification is shown by the arrow 15.

It may be that the contractor B sells motors and inverters manufactured by itself to the financial firm, which leases them to the contractor B, and then, the contractor B delivers and installs those motors and inverters at the facility of the contractor A.

According to the notification of the merit refund, the merit refund is paid from the contractor A to the contractor B, as mediated by the financial firm. This money flow is shown by the arrows 16 and 17. It is possible to ask a financial institute, such as banks and/or another institute, such as post offices and convenience stores, to perform the charge collection service, rather than have the financial firm perform this service.

Figure 2:
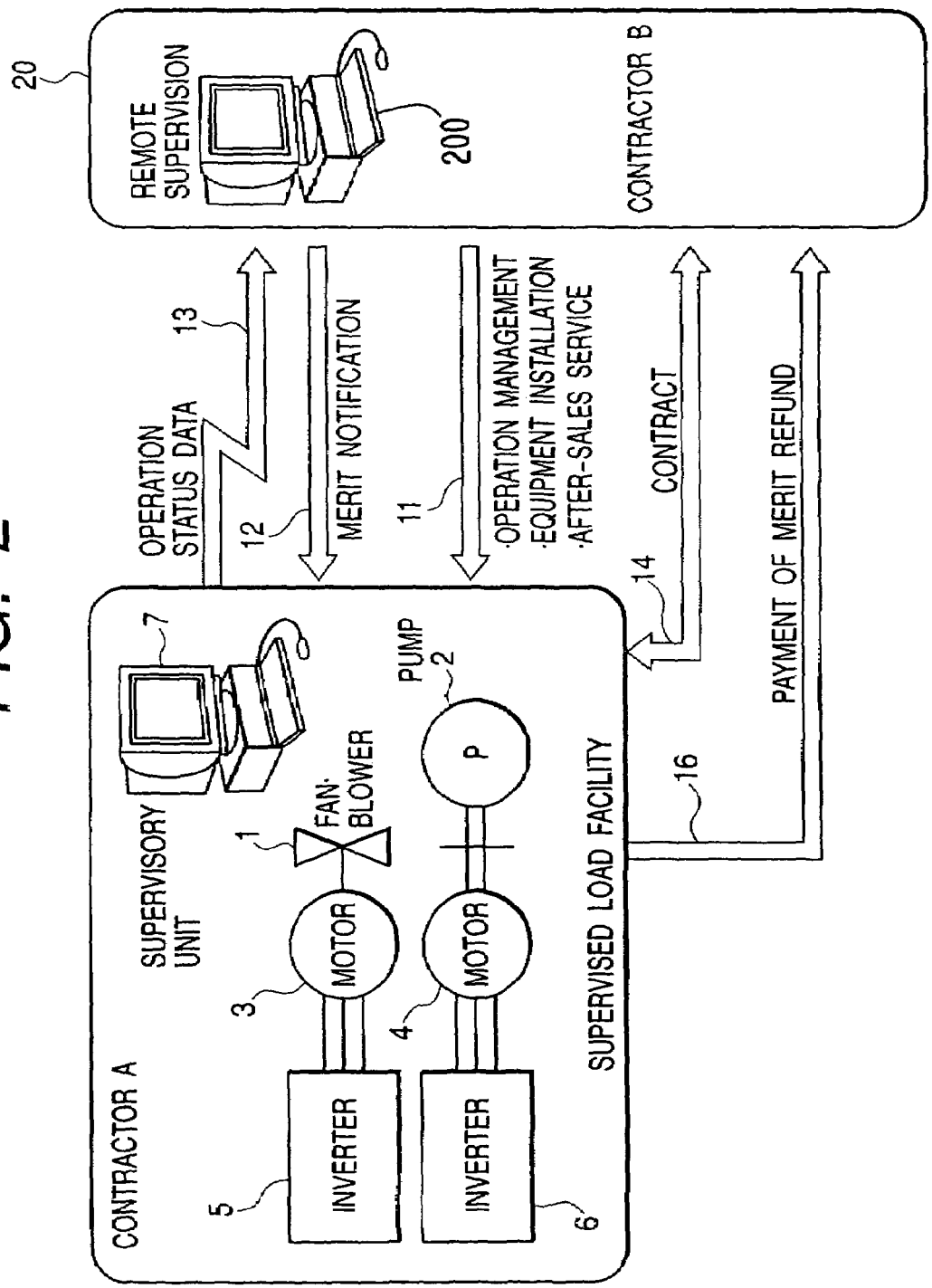
FIG. 2 is a schematic diagram of another embodiment of the present invention.

A case in which the contract is established directly between the contractor A and the contractor B is shown in FIG. 2, which is substantially equivalent to the case shown in FIG. 1, so that the details thereof are not described here.

The service equipment including motors, inverters and the supervisory unit are those owned by the contractor B itself or those leased or rented by the contractors, and are initially invested or installed at the factory of the contractor A. It is possible for the fee for their installation work and modification of the existing facility of the contractor A to be defined in another contract.

Figure 3:
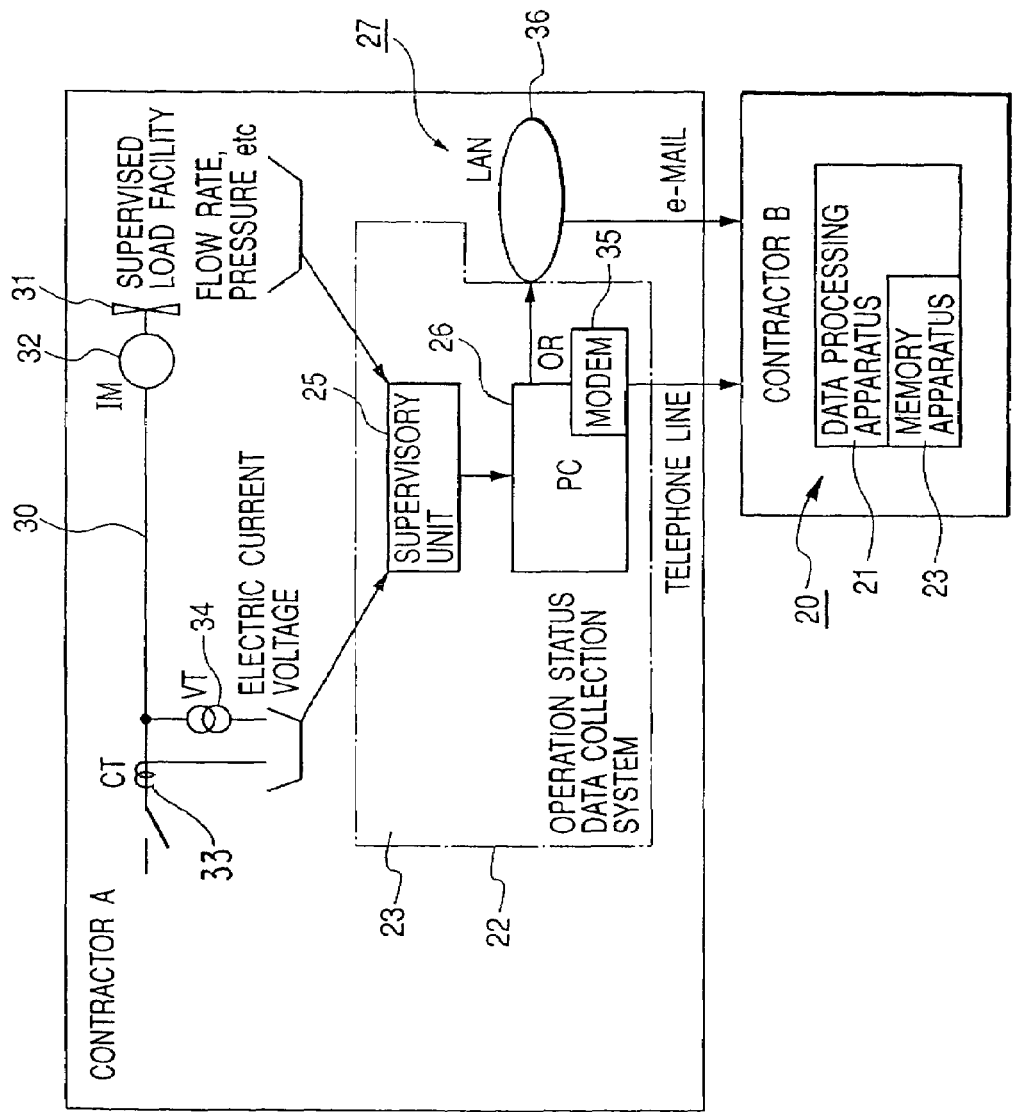
FIG. 3 is a block diagram showing one pattern for implementing the present invention.

The contractor A operates the supervised load facility with the inverter speed control optimized for his or her operation. FIG. 3 shows a method of collecting the electric power consumption data before the electric power consumption saving operation.

In FIG. 3, the driver motor (IM) 32 is connected to the supervised load facility 31 on the system 30, and the electric current and voltage are measured with the ampere meter (CT) 33 and the voltmeter (VT) 34 installed in the lines connected to the motor 32. The loads including flow volume and pressure are detected from the supervised load facility 31. Those measured and detected signals are supplied to the supervisory unit 25 (supervisory system) of the operation status data collection system 22.

The present operation data is calculated based on the data collected and processed statistically, and the computation results are transferred to the arithmetic unit (PC) 26.

The operation status data collection system 22, as described above, collects and processes statistically the operation status of the supervised load facility 31 as the present operation data, and collects and processes statistically the actual operation data of inverters operated with speed control by the inverter. The present operation data is the operation data based on either the present actual operation status or the present estimated operation status of the supervised load facility 31.

The operation status data collection system 22 is composed of the supervisory system 24 (including the supervisory, unit 25) for collecting the actual inverter operation data, the arithmetic unit (PC) 26 for processing statistically the actual inverter operation data, and the communication system 27 transmitting the integrated electric power data to the contractor B.

The calculation results are transmitted to the contractor B via email through the communication system 27, for example, via the modem 35 or LAN 36 of the contractor A. Though it is sufficient that the transmission of data is automated to be carried out once a day, it is possible to transmit the data any time. This data collection operation is performed by using the remote supervisory system 200 owned by the contractor B, as shown in FIG. 1 or FIG. 2.

The present operation data is transferred to the data processor in the remote supervisory system 20 and is stored in the memory apparatus 23.

Figure 4:
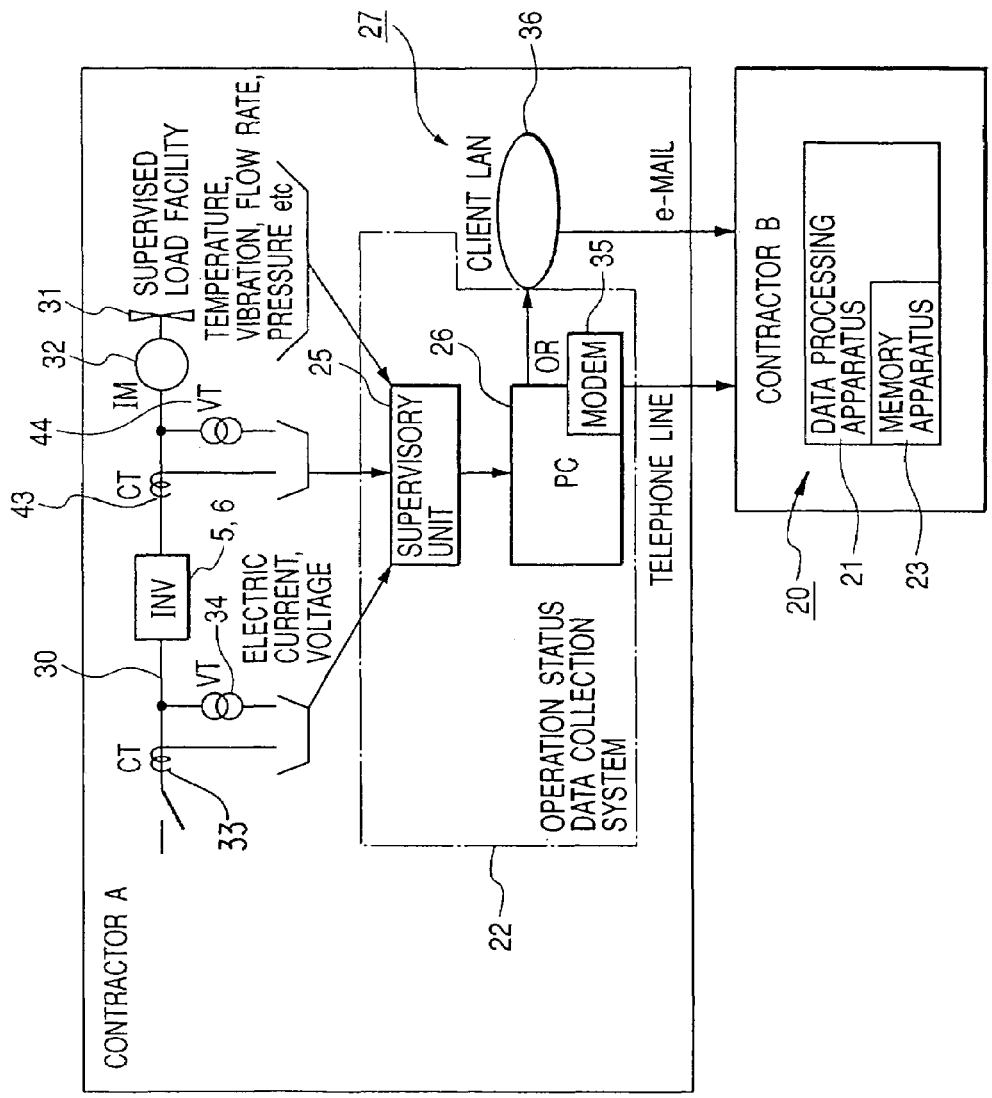
FIG. 4 is a block diagram showing another pattern for implementing the present invention.

FIG. 4 shows a method of collecting the actual operation data (actual inverter operation data) in case of installing inverters INV into the system and performing speed control. The components identical to those in FIG. 3 are identified by like numerals, and their description will not be repeated.

In the example shown in FIG. 4, inverters (INV) 5 and 6 are installed on the system 30, in addition to the electric current meter 33 and voltmeter 34 provided upstream of the inverters 5 and 6. Also, an electric current meter 43 and a voltmeter 44 are newly installed downstream of the inverters 5 and 6.

The electric current and voltage measured by the electric current meters 33 and 43, and the voltmeters 34 and 44, are transmitted to the supervisory unit 25 of the supervisory system. In addition, the loads including flow volume and the pressure of the supervised load facility 31 are similarly transmitted to the supervisory unit 25. In this case, it is possible to detect the temperature and vibration of the supervised load facility additionally and to transmit this data to the supervisory unit 25. Those detected values are used for maintenance later.

The electric power consumption is integrated based on the collection, statistical processing and/or calculation of the actual operation data. The integration results are transferred to the contractor B through the communication system 27. Though it is sufficient that the transmission of data is automated so as to be carried out once a day, it is possible to transmit the data any time.

This information collection is performed by using the remote supervisory system 200 owned by the contractor B, as shown in FIG. 1 or FIG. 2.

The electric power saving and the merit refund obtained can be calculated promptly based on the transmitted operation data, that is, the electric power consumption at the data processor 21 owned by the contractor B. The same results can be obtained by installing the memory apparatus 23 in the operation status data collection system 22, and by transmitting the results to the data processor 21. The computation results are communicated to the contractor A. In addition, it is possible for the merit refund to be calculated by the operation status data collection system 22. In view of the system configuration, it is preferable to use the remote supervisory system 20 to transmit the computation results of the merit refund and certain operation data to the contractor B. Owing to this configuration, the operation management by the remote supervisory system 20 can be established.

Figure 5:
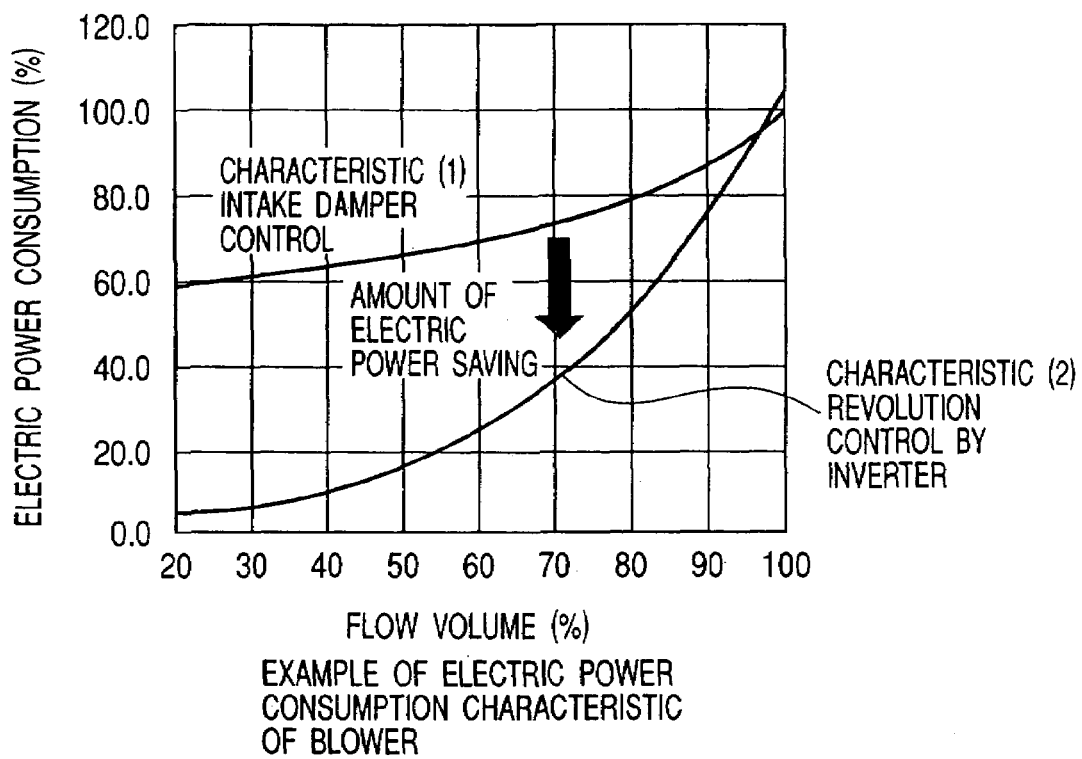
FIG. 5 is a graphical diagram showing an example of the characteristic of the electric power consumption of the blower.

FIG. 5 shows an example of the electric power consumption characteristic in case of applying a blower to the supervised load facility 31. In FIG. 5, the characteristic (1) shows the electric power consumption (%) relative to the flow volume (%) in case of the present intake damper control. The characteristic (1) is defined as the collected present operation status data and is used for the contract condition.

The characteristic (2) shows the electric power consumption (%) relative to the flow volume (%) in case of employing speed control by inverters in place of intake damper control. The characteristic (2) becomes the actual operation data in the case of speed control by the inverters. The electric power saving is calculated by substituting the characteristic (2) for the characteristic (1).

Though what is described in the above example is related to blowers, the electric power consumption saving associated with other equipment, such as fans and pumps, can be calculated similarly.

Figure 6:
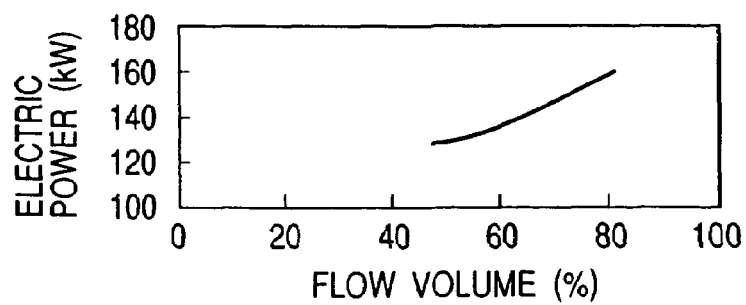
FIG. 6 is a graphical diagram showing a relation between gas volume and electric power used as an example of the contract condition before the, electric power consumption saving operation.

As described above, the parameters (for example, gas volume, flow volume and so on) which characterize the facility operation status and corresponding electric power consumption are measured by the operation status data collection system 22. The contract condition curve before the electric power consumption saving operation, as shown in FIG. 6, is generated from the measurement results, and is made to be a contract condition. FIG. 6 shows a relation between the gas volume (%) and the electric power in KW, and provides an example of the contract condition before the electric power consumption saving operation.

Figure 7:
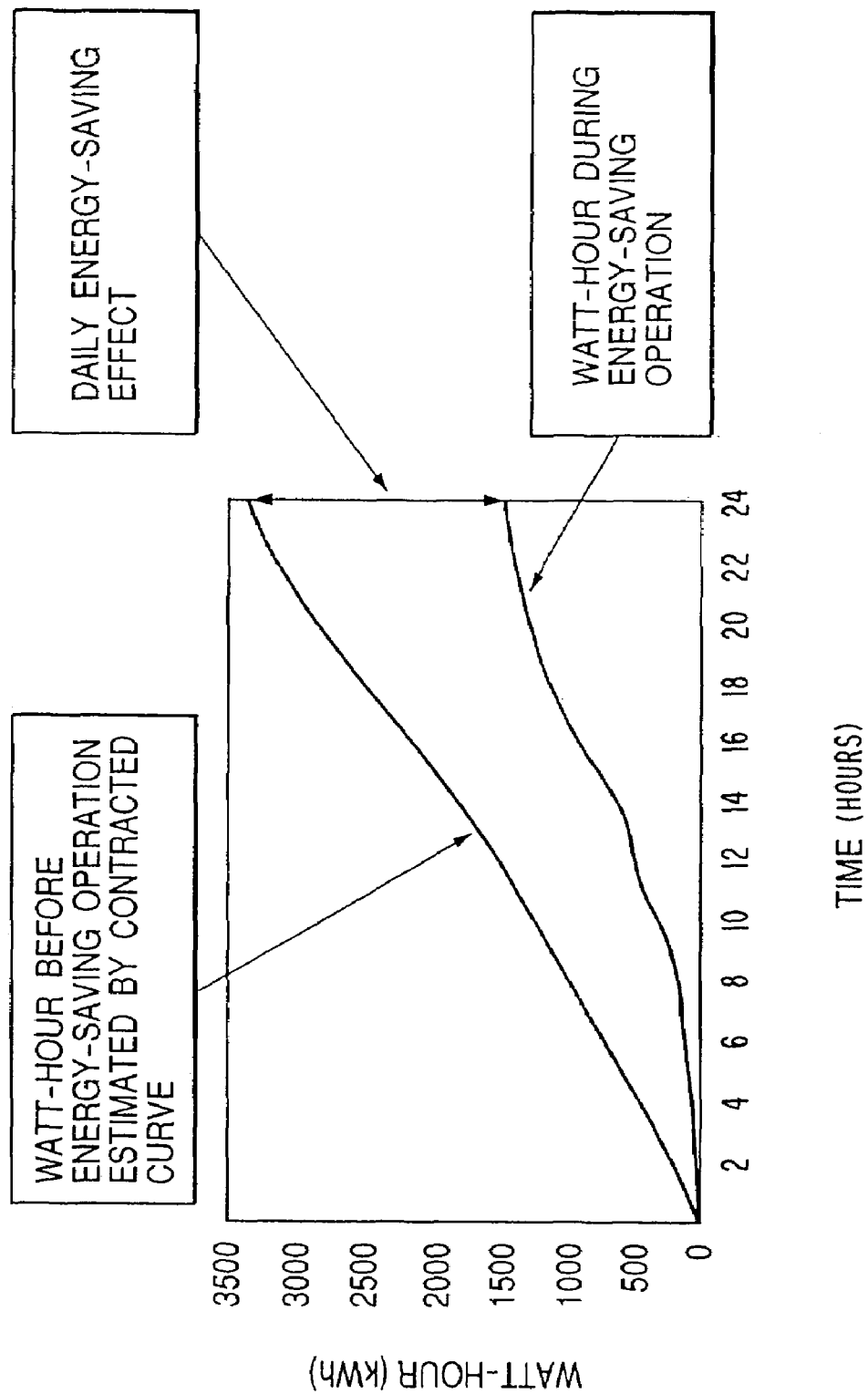
FIG. 7 is a graphical diagram showing an example of calculation of the effect of the electric power consumption saving.

FIG. 7 shows an example of the effect of the electric power consumption saving. The parameters (for example, gas volume, flow volume and so on) showing the facility operation status and corresponding electric power consumption are measured by the remote supervisory system 20. The effect of the electric power consumption saving is calculated by referring to the measurement results and the contract condition curve before the electric power consumption saving operation, as shown in FIG. 7. FIG. 7 shows an integrated electric power KWh at each time point. In FIG. 7, the integrated electric power before the electric power consumption saving operation calculated from the curve when starting the contract is processed statistically, and next, the integrated electric power during the electric power consumption saving operation is in no time processed statistically, and then, the daily effect of the electric power consumption saving is calculated on the basis of the difference between them at the end of a day.

The merit refund is calculated from the effect of the electric power consumption saving, that is, the amount of the electric power consumption saving multiplied by a unit power rate, and the charge and billing processing is performed by reflecting the merit refund according to the contract agreed upon by the contractors A and B, as well as the financial firm as the case may be. From the view point of the contractor A, this transaction is translated to establish the process for charging the fee to him or her.

A fraction, for example, half of the merit of the electric power consumption saving due to the operation of the newly installed facility is paid as a merit refund to the contractor B. This means that the merit refund is paid later, after the effect of the energy saving has been established. The merit of the electric power consumption saving is calculated from the actual operation data by the contractor B in accordance with the contract agreed upon between the contractors, based on information communicated to the contractor A monthly. It is possible for the operation data used before charge and billing processing is performed by the contractor B to be reviewed by the contractor B. So far, the charge and billing processes based on the merit refund have been performed. As for the maintenance of the facility, it is possible for the contractor B to provide maintenance services free of charge, and for the daily inspection to depend on the contractor A.

FIG. 8 is a flow chart showing the charge and billing process. As shown in FIG. 8, the flow of the charge and billing process includes a preliminary investigation using a marketing approach (SI), and the proposal for the offer of service from the contractor A to the contractor B is presented after obtaining the application from the contractor A (S2). The commercial profit is examined on the basis of field research on the facility of the contractor A (S3). The operation status data is collected by collecting the present operation status data (S4). The data collection continues, for example, for two months, and the data analysis, the final commercial profit study, and the presentation of the contract conditions are then performed (S5). The contract for using the facility is executed (S6), and the hardware installation is done, (S8) by installing equipment in the facility, including motors and inverters (S8). In operating the installed facility, further operation status data is collected by collecting the actual operation data (S9). The calculation of the merit, the notification of the merit, and the charge and billing process are performed by referring to the collected operation status data (S10). Finally, the after-sales service is provided (S11).

According to this embodiment, the merit for the contractor A (user) includes the following items.

(1) The contractor A can achieve an energy saving of the electric power at a facility having motors.

(2) The contractor A can achieve the energy saving without any initial investment.

(3) The contractor A can execute the contract after verifying the effect of the electric power consumption saving, and so he or she does not need to make an ineffective investment.

(4) The contractor A can operate the facility in an electric power consumption saving mode, and he or she can save the operation cost of the facility.

The merit for the contractor B (service provider) includes the following items.

(1) The contractor B can ensure an income by sharing the fraction of the merit refund.

(2) The contractor B can develop a new retail market for motors and inverters.

(3) The contractor B can make it easier to manage the operation at the facility of the contractor A and reduce its management cost by employing a remote supervisory system.

According to the energy saving service offering method and apparatus of the present invention, as described above, it will be appreciated that the user can achieve an energy saving as his or her commitment without any initial investment, and that the service provider can obtain a share of the merit refund associated with the energy saving.

What is claimed is:

1. An energy saving support service offering method, comprising the steps of:
   measuring values of at least one parameter of a load facility having a motor which varies with time and electric power consumption at a predetermined interval;
   determining an electric power consumption of the load facility in accordance with the measured values of the at least one parameter obtained at the predetermined time interval;
   introducing an inverter at least in the load facility with an expense of an energy saving support service provider and/or its cooperatives;
   performing an electric power saving operation by an inverter control operation; and
   determining an integrated amount of electric energy saving over a predetermined period of time in accordance with measured values of the at least one parameter at the predetermined time interval indicative of the power consumption when performing the electric power saving operation and the determined electric power consumption of the load facility before introducing of the inverter.

2. An energy saving support service offering method according to claim 1, further comprising the steps of:
   estimating an amount of saved electric power; and
   obtaining a merit refund in accordance with said saved electric power.

3. An energy saving support service offering method according to claim 1, comprising the steps of:
   estimating an amount of saved electric power; and
   charging and billing a merit refund to a user of said load facility in accordance with said saved electric power.

4. An energy saving support service offering method according to claim 1, wherein the at least one parameter includes at least one of a flow volume and pressure.

5. An energy saving operation method for a load facility, comprising the steps of:
   measuring values of at least one parameter of a load facility having a motor which varies with time and electric power consumption at a predetermined interval;
   determining an electric power consumption of the load facility in accordance with the measured values of the at least one parameter obtained at the predetermined time interval;
   estimating an electric power consumption by a user for the load facility having the motor;
   introducing an inverter to the load facility with a user's economical expense being zero or minimized;
   performing an inverter operation of the load facility; and
   determining an integrated amount of electric energy saving over a predetermined period of time in accordance with measured values of the at least one parameter at the predetermined time interval indicative of power consumption when performing the inverter operation and the determined electric power consumption of the load facility before introducing of the inverter.

6. An energy saving operation method for a load facility according to claim 5, further comprising the step of:
   obtaining an inverter control operation data.

7. An energy saving operation method for a load facility according to claim 6, further comprising the steps of:
   obtaining a difference between an electric power consumption of the load facility before introducing of the inverter and an electric power consumption with an inverter control operation; and
   obtaining a merit refund based on an electric power consumption saving which is obtained according to the difference.

8. An energy saving support service offering method according to claim 5, wherein the at least one parameter includes at least one of a flow volume and pressure.

9. An energy saving service providing method comprising the steps of:
   measuring values of at least one parameter of a load facility which varies with time and electric power consumption at a predetermined interval;
   determining an electric power consumption of the load facility in accordance with the measured values of the at least one parameter obtained at the predetermined time interval;
   deriving a consumed energy saving amount of a user by introducing energy saving equipment on the basis of an energy consumption data upon normal operation of the load facility of the user prior to introducing the energy saving equipment and an energy saving operation data upon energy saving operation of the load facility by the energy saving equipment as provided from a service provider for the load facility of the user;
   determining an integrated amount of electric energy saving over a predetermined period of time in accordance with measured values of the at least one parameter at the predetermined interval indicative of power consumption when performing the energy saving operation and the determined electric power consumption of the load facility before introducing of the energy saving equipment: and
   charging a fee depending upon the energy saving amount and consideration of a content of a predetermined contract as service for energy saving by providing the energy saving equipment to the user from the service provider.

10. An energy saving support service offering method according to claim 9, wherein the at least one parameter includes at least one of a flow volume and pressure.

11. An energy saving service providing method comprising the steps of:
    measuring values of at least one parameter of a load facility having a motor which varies with time and electric power consumption at a predetermined interval;
    determining an electric power consumption of the load facility in accordance with the measured values of the at least one parameter obtained at the predetermined time interval;
    deriving a consumed power saving amount of a user by introducing an inverter on the basis of a power consumption data to the load facility of a user having the motor and performing a revolution speed controlled operation of the motor by introducing of an inverter;
    determining an integrated amount of electric energy saving over a predetermined period of time in accordance with measured values of the at least one parameter at the predetermined interval indicative of power consumption when performing the revolution speed controlled operation and the determined electric power consumption of the load facility before introducing of the inverter; and charging a fee depending upon said power saving amount and consideration of a content of a predetermined contract as service for power saving by providing the inverter to user.

12. An energy saving support service offering method according to claim 11, wherein the at least one parameter includes at least one of a flow volume and pressure.

13. An energy saving aiding method comprising the steps of:

measuring values of at least one parameter of a load facility which varies with time and electric power consumption at a predetermined interval;

determining an electric power consumption of the load facility in accordance with the measured values of the at least one parameter obtained at the predetermined time interval;

providing an energy saving equipment for a load facility of a user under expense by at least one of an energy saving aiding service provider and a co-worker thereof;

determining an integrated amount of electric energy saving over a predetermined period of time in accordance with measured values of the at least one parameter at the predetermined interval indicative of power consumption when performing an operation using the energy saving equipment and the determined electric power consumption of the load facility before introducing of the energy saving equipment; and directly or indirectly notifying or charging a merit fee in consideration of an energy saving amount as performing energy saving operation of the load facility of the user by the energy saving equipment to the user in possession of load facility by the at least one of said energy saving aiding service provider and the co-worker thereof.

14. An energy saving support service offering method according to claim 13, wherein the at least one parameter includes at least one of a flow volume and pressure.

* * * * *